United States Patent [19]

Yamagawa et al.

[11] Patent Number: 4,639,550
[45] Date of Patent: Jan. 27, 1987

[54] CORDLESS TELEPHONE

[75] Inventors: Masato Yamagawa, Kanagawa; Keizo Tsukada, Tokyo, both of Japan

[73] Assignee: Sony Corporation, Tokyo, Japan

[21] Appl. No.: 722,359

[22] Filed: Apr. 12, 1985

[30] Foreign Application Priority Data

Apr. 20, 1984 [JP] Japan .................. 59-79784

[51] Int. Cl.$^4$ ............................. H04Q 7/04
[52] U.S. Cl. ........................ 379/62; 455/88
[58] Field of Search ............... 179/2 E, 2 EA, 2 EB; 455/88

[56] References Cited

U.S. PATENT DOCUMENTS 4,535,200 8/1985 Himmelbauer et al. ......... 179/2 EA
4,593,155 6/1986 Hawkins ......................... 179/2 EA Primary Examiner—Robert G. Lev
Attorney, Agent, or Firm—Lewis H. Eslinger; Alvin Sinderbrand

[57] ABSTRACT

A cordless telephone includes a base unit and a handset unit. When the handset unit is mounted on the base unit, an identifying code is automatically generated and stored in both units. Thereafter, when an incoming or outgoing telephone call is initiated, the two stored identifying codes are compared, and the telephone call proceeds only if the two identifying codes are identical. The new identifying code is generated as a counted value in accordance with a predetermined time following the mounting of the handset unit of the base unit. By having the predetermined time vary from telephone to telephone, the identifying codes will also vary, eliminating crosstalk interference and the risk of wiretapping.

23 Claims, 10 Drawing Figures

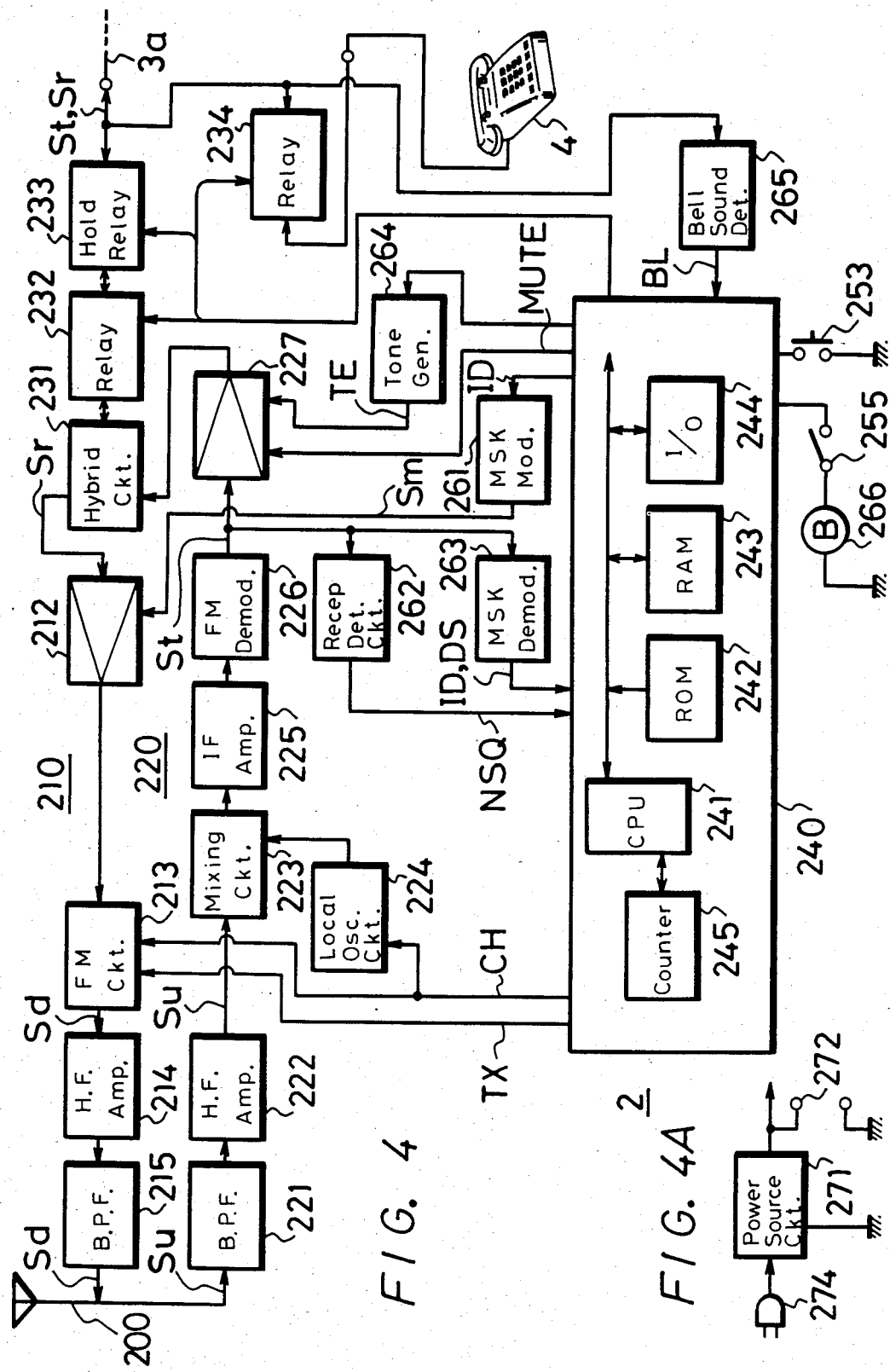

CORDLESS TELEPHONE

RELATED APPLICATION

U.S. patent application Ser. No. 06/696,183, filed Jan. 29, 1985 in the name of persons having an obligation of assignment to the assignee of the present invention and commonly assigned herewith.

FIELD OF THE INVENTION

The present invention relates generally to cordless telephones, and in particular relates to a cordless telephone system using identifying codes for establishing a communication channel.

BACKGROUND OF THE INVENTION

The standard telephone consists of a base unit and a handset unit connected to each other by an electrical cord. The base unit itself is connected by another cord to a receptacle on a wall, telephone pole or a similar immovable structure to which the telephone network line extends. Therefore, the range of movement of the operator of the telephone is quite limited. Even when the cords connecting the handset unit to the base unit and the base unit to the wall are long, it can be cumbersome to move either the entire telephone around to make calls from different locations or to walk around with the handset unit once a call has been placed. The simple fact that there is always a continuous physical connection between the person making the phone call and the immovable wall or other fixed structure can be a great inconvenience.

The cordless telephone represents a significant improvement over the standard telephone. In the conventional cordless telephone, the base unit is still connected to the receptacle on the immovable wall or the like by a cord so that message signals from the telephone network line may be received and transmitted. However, the handset unit of the cordless telephone is an independently operative unit from which calls may be made and by which calls may be received with no physical connection to the base unit. Instead, the base unit and the handset unit of the cordless telephone communicate with each other over a communication channel established by the transmission and reception of electromagnetic waves, conventionally radio waves. The handset unit may then be taken to distances of up to 300 meters from the base unit, while still making and receiving telephone calls. Since the handset unit is not attached to any fixed power supply, it is generally powered by batteries.

The cordless telephone itself presents certain difficulties. In particular, if several cordless telephones are being used within the same general area, the signal transmitted from one handset unit to its own base unit may be picked up by the base unit of a completely different cordless telephone, leading to crosstalk interference. A second, more sophisticated, difficulty is that, since the radio waves establishing the communication channel between the handset unit and the base unit may be received by any appropriately located antenna, it is possible to "wiretap" the cordless telephone, so that a third party can listen in on or intercept conversations. Under many circumstances, this is highly undesirable. The term "wiretap" is somewhat incongruous in this situation, since there is no physical wire to be tapped, but this term is customarily used for any act of listening in on, or intercepting, other people's telephone conversation, and the present specification will use the term "wiretap" in that sense, that is, to mean the unauthorized listening in on telephone conversations through the reception of the radio waves transmitted between the handset unit and the base unit of a cordless telephone.

To overcome these problems, two systems have been proposed. In the first system, mechanical switches for selecting a code number as an arbitrary combination of four digits, from "0000" to "9999", are provided on both the handset unit and the base unit. These switches are manually set by the operator of the telephone set. If both sets of switches are set to the same code number, the communication channel can be established and telephone messages transmitted. If, however, the switches are set to different code numbers, means are provided within the base unit for cutting off the communication channel. The radio waves transmitted between the handset unit and the base unit include this identifying code information. By this means, interference between one telephone and any other cordless telephone operating in the general neighborhood can be avoided and the possibility of wiretapping can be reduced. However, this system requires four manually actuable switches on each of the handset unit and base unit, which inevitably increases the manufacturing cost. Furthermore, the switches are placed so as to be easily operable from the surfaces of the units. As a result, it is quite likely that the operator may inadvertently change the code number of the handset unit by actuating one of the switches without realizing it. When the code number of the handset unit is thereby different from that of the base unit, communication between the two units is prevented. This difficulty can be removed by resetting the code numbers of both the handset unit and the base unit, but this requires the operator to walk back to the base unit, which is the very thing that a cordless telephone is supposed to avoid.

A second system for overcoming the wiretapping and interference problems, proposed by a person or persons having an obligation of assignment to the assignee of the present invention, is to have a memory within each of the handset unit and the base unit and to store the identifying codes therein. When the operator wants to make an outgoing call, the identifying code is transmitted from the handset unit to the base unit over the communication channel created by the radio waves. The base unit contains means for checking whether the received identifying code is the same as the identifying code stored in its own memory. If the two are the same, the communication channel is kept open and the telephone call proceeds. If not, the communication channel is cut off. Similarly, if an incoming call is received by the base unit over the telephone network line, the base unit transmits its stored identifying code to the handset unit, which in turn compares the received identifying code with the identifying code stored in its own memory. Again, only if the two identifying codes are the same is the communication channel kept open.

However, once again this presents difficulties. As earlier noted, the handset unit must contain its own power supply, and to keep it ready to receive an incoming call a certain power drain will always be present. If the power supply is a dry cell battery, it will quickly be discharged, so that there is the significant inconvenience of frequently replacing the battery, not to mention the additional cost.

If, on the other hand, a rechargeable battery is used, such as an Ni-Cd alkaline battery, it may be recharged by mounting the handset unit on the base unit. During the period of recharging, there needs to be some backup for the memory that stores the identifying code. This may be accomplished by either a backup battery or a backup nonvolatile memory. If a backup battery is used, it must be quite powerful, since the period for recharging the battery is not constant. The handset is then large and heavy. Conversely, if a backup memory is used, the entire system becomes more complicated and requires a much greater manufacturing cost. A third difficulty is that if a third party should ever learn the particular code number stored in the memories of a particular telephone, that telephone may be easily wiretapped. Since there is no provision for changing the code numbers, either the telephone must be replaced or it will continue to be susceptible to being wiretapped.

A third system, disclosed in U.S. patent application Ser. No. 06/696,183, cited above as a related application, is for the base unit to have identifying code generating means for automatically generating one of a plurality of identifying codes upon the mounting of the handset unit upon the base unit, and means for initially transmitting the generated identifying code over the communication channel to the handset unit, wherein it is stored in the memory. In accordance with that invention, the identifying code may be easily and automatically changed each time the handset unit is mounted on the base unit, and the need for backup batteries or a nonvolatile memory is eliminated. It remains important to ensure that the identifying codes generated in one particular telephone are different from the identifying codes generated in any other telephone and further are not predictable from one identifying code to the next.

OBJECTS AND SUMMARY OF THE INVENTION

Accordingly, it is an object of the present invention to provide an improved cordless telephone which eliminates the difficulties of the prior art.

It is another object of the present invention to provide a cordless telephone which greatly reduces the possibility of wiretapping by a third party.

It is still another object of the present invention to provide a cordless telephone which is small and lightweight and of reduced manufacturing cost.

It is yet another object of the present invention to provide a cordless telephone of the type using identifying codes and wherein the identifying codes used in a particular telephone are different from the identifying codes used in any other telephone.

In accordance with an important aspect of the present invention, there is provided a cordless telephone comprising a base unit connectable to a telephone network line for receiving and transmitting message signals therethrough, a handset unit selectively mountable upon and separable from the base unit, the base unit and the handset unit each including means for transmitting an identifying code signal over electromagnetic waves and means for receiving a transmitted identifying code signal, the base unit including first memory means, first detecting means for generating a first detected output upon the mounting of the handset unit upon the base unit, means for automatically generating a counted value in response to the first detected output and a predetermined time interval associated therewith, and first means for storing the counted value as a new identifying code signal in the first memory means, the means for transmitting in the base unit thereupon transmitting the new identifying code signal to the handset unit, the handset unit including second memory means, second detecting means for generating a second detected output upon the mounting of the handset unit upon the base unit and second means for storing the new identifying code signal in the second memory means in response to the second detected output, the base and handset units each further including identity detecting means for detecting when a received identifying code signal is identical to an identifying code signal stored in the first and second memory means, respectively, and means for establishing a communication channel between the base unit and the handset unit only when identity is detected.

In a preferred embodiment of the cordless telephone according to the present invention, the means for automatically generating a counted value includes a counter, which starts counting upon the generation of the first detected output when the handset unit is mounted on the base unit, and a timing circuit with a predetermined time constant for causing the counter to stop counting upon the expiration of the predetermined time. The count at such point in time is stored as the new identifying code. By having the predetermined time for any particular cordless telephone lie with a predetermined range, the particular values of the count, and hence the new identifying codes, will be different from one cordless telephone to the next. A new identifying code is generated and stored in both the handset unit and base unit whenever the handset unit is returned to or mounted on the base unit. The identifying code can thus be frequently changed, so that it is virtually impossible for a third party to know the correct identifying code at any given time. Furthermore, since identifying codes are used, interference crosstalk is eliminated.

These and other objects, features and advantages of the cordless telephone according to the present invention will become apparent from the following detailed description and accompanying drawings, throughout which like reference numerals designate like elements and parts.

BRIEF DESCRIPTION OF THE DRAWINGS

FIG. 4 is a block diagram illustrating a portion of the circuitry of the base unit;

FIG. 4A is a schematic diagram illustrating another portion of the circuitry of the base unit;

DESCRIPTION OF THE PREFERRED EMBODIMENT

Figure 1:
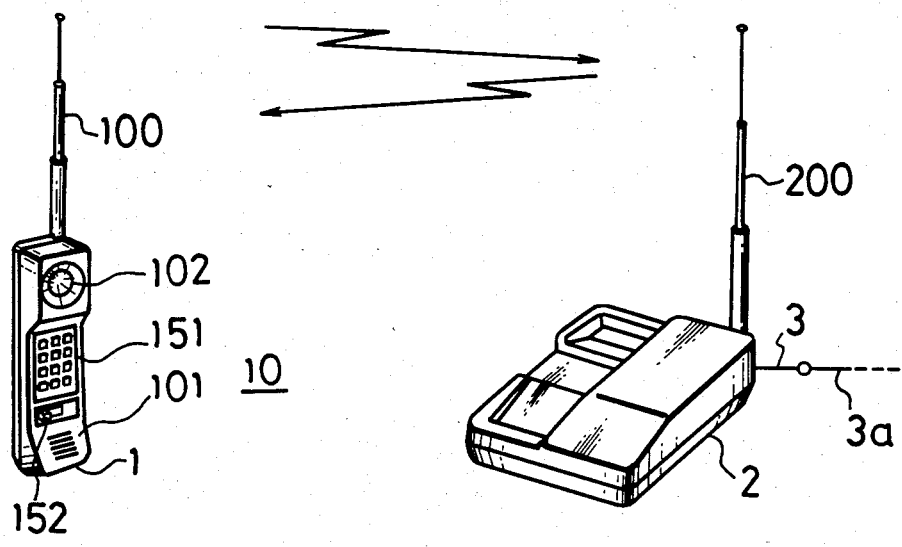
FIG. 1 is a perspective view of a cordless telephone according to an embodiment of the present invention, showing a handset unit separated from a base unit.
Figure 2:
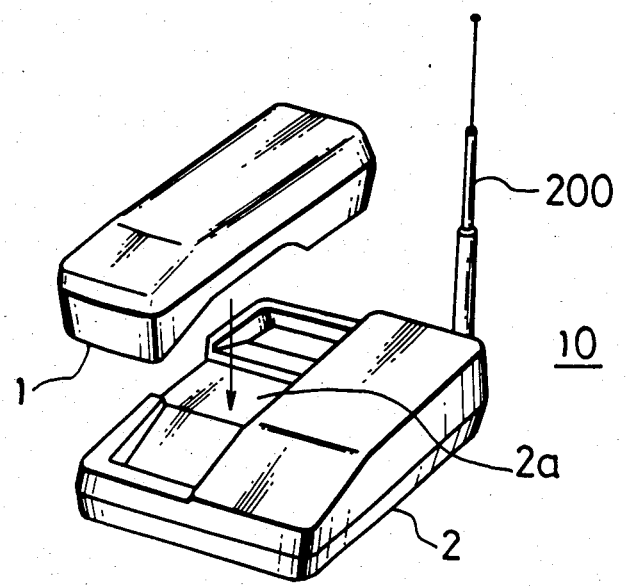
FIG. 2 is perspective view of the cordless telephone of FIG. 1, but showing the handset unit mounted on the base unit.

Referring to the drawings in detail, and initially to FIGS. 1 and 2 thereof, a cordless telephone 10 according to the present invention is shown to include a handset unit 1 and a base unit 2. Base unit 2 is connected by a telephone cord 3 to an outlet or receptacle in a wall, a telephone pole, or another fixed structure, so that it may both receive and transmit telephone message signals through a telephone network line 3a and also may be powered thereby. An antenna 100 on handset unit 1 and a corresponding antenna 200 on base unit 2 are used to create the communication channel between the two units by the transmission and reception of radio waves, schematically illustrated in FIG. 1 by the arrows extending between the antennas. As is conventional, handset unit 1 includes a ten-key panel 151 for making or dialing outgoing calls, a mouthpiece 101 and an earpiece 102. Handset unit 1 also includes a talk button 152 which has a STANDBY position in which cordless telephone 10 is enabled to receive an incoming call but is not in present use, and a TALK position in which a telephone call may be made. With talk button 152 in its TALK position, a telephone number may be entered on ten-key panel 151, and corresponding information is transmitted over the communication channel to base unit 2 and thence to telephone network line 3a. Alternatively, with talk button 152 in the STANDBY position, when base unit 2 receives a message signal from the telephone network line indicating that an incoming call is present, a bell in handset unit 1 rings to indicate the existence of the incoming call. The operator may then place talk button 152 in the TALK position to receive the call. Only when talk button 152 is in the TALK position may the operator talk to an outside caller.

The standard maximum separation of such a handset unit 1 and base unit 2 is about 300 meters, set by the Federal Communications Commission. The frequencies of the radio waves transmitted therebetween are in the 40 MHz band, and typically there are ten duplex channels permitted for each system.

Since handset unit 1 is not connected to a power line, it must contain its own power supply, which is advantageously a rechargeable battery. The battery is recharged by mounting handset unit 1 on a concave mounting portion 2a of base unit 2, as illustrated in FIG. 2. Handset unit 1 and base unit 2 have matching electrical contacts through which power may be supplied to handset unit 1 to recharge the battery. It is when handset unit 1 is thus mounted on base unit 2 to recharge the battery that the identifying code is automatically generated and stored in the memories contained within handset unit 1 and base unit 2. Even when the battery is charged, however, handset unit 1 may be mounted on base unit 2 purely for the purpose of resetting the identifying code.

Figures 3, 3A:
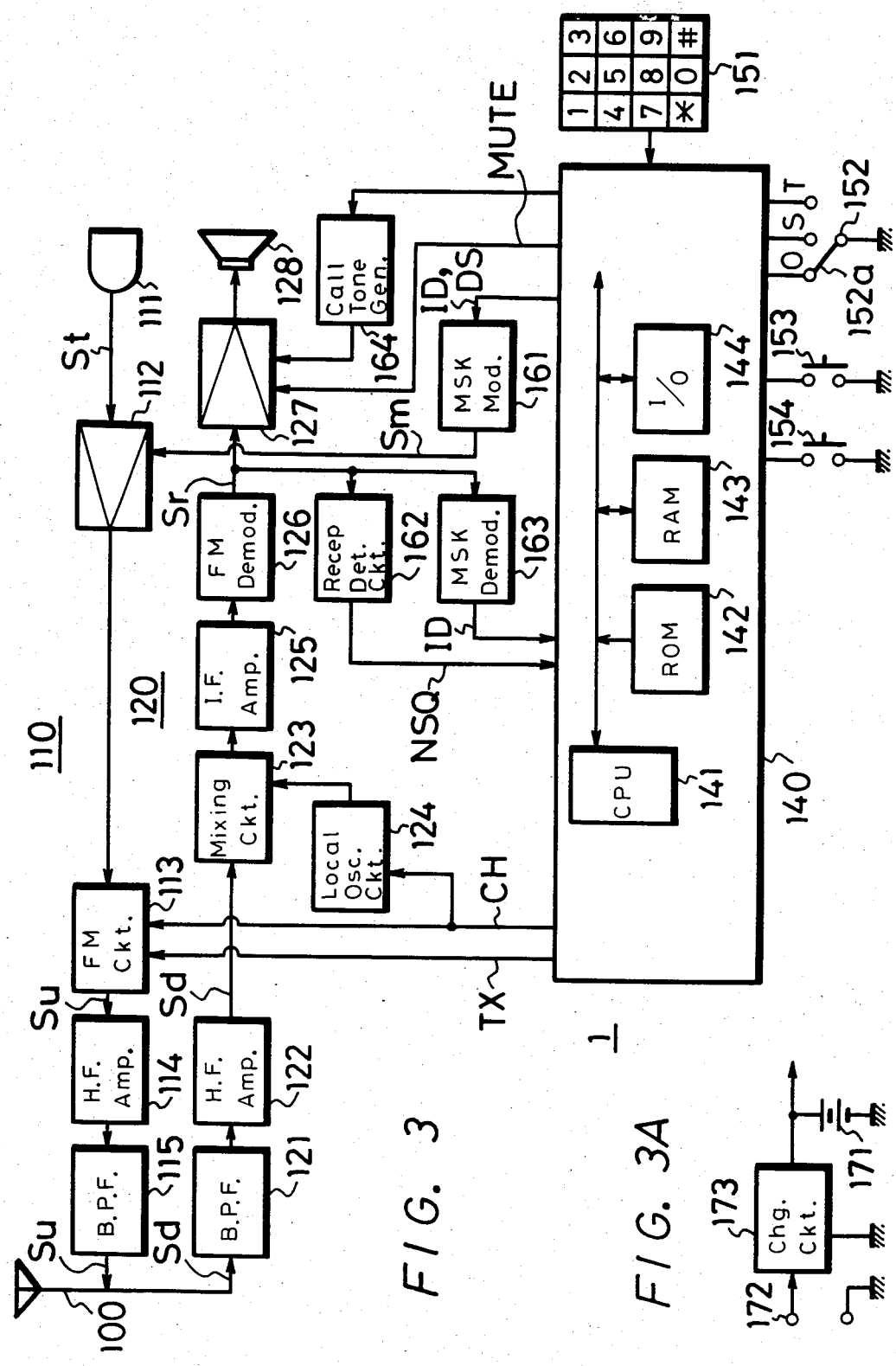
FIG. 3 is a block diagram illustrating a portion of the circuitry of the handset unit.
FIG. 3A is a schematic diagram illustrating another portion of the circuitry of the handset unit.

Referring now to FIGS. 3 and 4, important portions of the circuitry contained within handset unit 1 and base unit 2, respectively, are therein illustrated. It should be noted that the circuitry within these two units contains many correspondingly elements, so that the two figures and their accompanying description should be considered together.

Handset unit 1 (FIG. 3) includes a transmission system 110, including elements bearing reference numerals 111 to 115, and a receiving system 120, including elements bearing reference numerals 121 to 128. Base unit 2 (FIG. 4) similarly includes a transmission system 210, including elements bearing reference numerals 212 to 215, and a receiving system 220, including elements bearing reference numerals 221 to 227. Base unit 2 also includes a signal transmission circuit, including elements 231 to 234, and serving to link the transmission system 110 and the receiving system 120 to telephone network line 3a. For a better understanding of the present invention, the function and operation of these elements will be described as signals are transmitted between the two units. In the illustrated embodiment, the signals are transmitted over a selected one of two allowed duplex channels, A and B, each containing an upper channel and a lower channel.

Therefore, for the transmission of a signal from handset unit 1 (FIG. 3), an audio signal St from a transmitter 111 contained within mouthpiece 101 of handset unit 1 is supplied through an audio frequency amplifier 112 to a frequency modulating circuit 113, which outputs a corresponding high frequency FM signal Su in the upper channel of a selected one of duplex channels A or B. For this purpose, a frequency modulating circuit 113 is provided with a channel selecting signal CH generated in accordance with the operation of a channel selector switch 154. Channel selecting signal CH may be used to determine the frequency of a local oscillator signal used to frequency convert the FM signal to radio frequencies. Signal Su is supplied through a high frequency amplifier 114 and a band pass filter 115 with a pass band including both upper channels to antenna 100, by which it is transmitted as a radio frequency wave to base unit 2 over the communication channel.

Referring now to FIG. 4, signal Su transmitted from handset unit 1 is received at base unit 2 by antenna 200 and is supplied through a band pass filter 221 and a high frequency amplifier 222 to a mixing circuit 223. Mixing circuit 223 receives a local oscillation signal from a local oscillator circuit 224 receiving channel selecting signal CH to frequency convert the signal Su to an FM intermediate frequency signal. This FM signal is supplied through an intermediate frequency amplifier 225 to an FM demodulating circuit 226, wherein it is demodulated to produce audio signal St. Audio signal St is passed to telephone network line 3a through an audio frequency amplifier 227 and the signal transmission circuit comprising a hybrid circuit 231, a relay 232 and a hold relay 233. Hybrid circuit 231 has solid state components and moving contacts to form a transition between the electronic receiving system 220 and the electromechanical relays 232, 233. Relay 232 is of the type to make and break the connection between base unit 2 and telephone network line 3, while hold relay 233 can hold a connection with telephone network line 3a after it is connected to base unit 2, so as to allow telephone communication between base unit 2 and telephone network line 3a to be temporarily interrupted during an intercom operation, while keeping the incoming call available on telephone network line 3a.

The transmission of signals from base unit 2 to handset unit 1 will now be described. When incoming message signals are received from telephone network line 3a, the audio signal Sr is supplied through hold relay 233, relay 232, hybrid circuit 231 and audio frequency amplifier 212 to a frequency modulating circuit 213, which outputs a corresponding high frequency FM signal Sd in the lower channel of the same duplex channel (A or B) as signal Su. Frequency modulating circuit 213 is supplied with channel selecting signal CH for this purpose. Signal Sd is supplied through a high frequency amplifier 214 and a band pass filter 215 with a pass band including the lower channels of both A and B channels to antenna 200, by which it is transmitted to handset 1 over the communication channel.

Referring back to FIG. 3, signal Sd is received by antenna 100 and is supplied through a band pass filter 121 with a pass band including both lower channels and a high frequency amplifier 122 to a mixing circuit 123. Mixing circuit 123 is supplied with a local oscillation signal from a local oscillator circuit 124 receiving channel selecting signal CH, so that signal Sd is frequency converted to an FM intermediate frequency signal. This FM signal is supplied through an intermediate frequency amplifier 125 to an FM demodulating circuit 126, wherein it is demodulated to the audio signal Sr and supplied through an audio frequency amplifier 127 to an electro-audio transducer or loudspeaker 128 contained within earpiece 101 of handset unit 1.

In accordance with an important aspect of the present invention, handset unit 1 further contains a control circuit, generally designated by reference numeral 140 in FIG. 3, and base unit 2 similarly contains a control circuit, generally indicated by reference numeral 240 in FIG. 4. These control circuits may each advantageously be comprised in great part by a microprocessor or microcomputer, contained on a single integrated chip. Control circuit 140 includes a central processing unit (CPU) 141, which may be adapted for 4-bit parallel processing, a read only memory (ROM) 142, which stores control programs for controlling the operation of CPU 141, a random access memory (RAM) 143 serving as a work and storage area, and input/output (I/O) port 144.

Similarly in base unit 2, control circuit 240 includes a CPU 241, a ROM 242, a RAM 243 and an I/O port 244, each performing a function corresponding to that of the element of control circuit 140 having the same two final digits in the reference numeral. A detailed description is given below of the operation and control of each of these elements, but it should be understood that a control circuit such as control circuits 140 and 240 may, under the control of an appropriate control program, be designed to perform different functions at different times and to control the operation of several elements. At each stage of operation of the control circuit by the control program, the control circuit may be viewed as a means for performing a certain function. For instance, according to an aspect of the present invention, a new identifying code is generated as a counted value each time handset unit 1 is mounted on base unit 2. At such time, control circuits 140, 240 may be regarded as means for automatically generating a counted value. Similarly, in accordance with another aspect of the present invention, two identifying codes are compared for identity to establish the communication channel, and at such time control circuits 140, 240 may be regarded as identity detecting means. The discussion below will make clear at all times what functions control circuits 140 and 240 are performing and precisely how such functions are carried out.

Connected to control circuit 140 and controlled thereby are ten-key panel 151, talk switch 152, an intercom key 153 and the above-mentioned channel selector key 154. Ten-key panel 151 has conventional non-lock push button switches for inputting the telephone number to be called. Talk switch 152 is a three position change-over switch used for selecting the operational mode of handset unit 1. When a movable contact 152a of talk switch 152 contacts fixed contact O, the power is turned off to all the elements within handset unit 1 except control circuit 140, to place handset unit 1 in the off mode. When movable contact 152a contacts fixed contact S, control circuit 140 is placed in the standby mode to await the signal Sd from base unit 2. When movable contact 152a contacts fixed contact T, handset unit 1 is placed in the talk mode and the communication channel between handset unit 1 and base unit 2 may be established.

Intercom key 153 is also a non-lock push button switch for calling base unit 2 when handset unit 1 and base unit 2 are to be used in a dual phone system with an auxiliary telephone 4. Channel selector key 154 is a non-lock push button switch for selecting either channel A or B for the communication channel between handset unit 1 and base unit 2. This signal specifies the desired upper or lower channel by specifying the frequency dividing ratio of a variable frequency dividing circuit contained within local oscillator circuit 124. The respective outputs from the push button switches forming ten-key panel 151, talk switch 152, intercom key 153 and channel selector key 154 are supplied to control circuit 140 for processing.

An MSK (minimum shift key) modulating circuit 161 is connected to control circuit 140 for converting binary signals supplied thereto by control circuit 140 to an MSK signal Sm in the audio frequency band. These binary signals include an identifying code ID, which will be described in greater detail later, and a dial signal DS corresponding to the telephone number entered through ten-key panel 151. MSK signal Sm is supplied to audio frequency amplifier 112 for transmission to base unit 2 in the manner described above. The output of FM demodulating circuit 126 is also supplied to a reception detecting circuit 162 for detecting the presence or absence of signal Sd in the output. As is well known, the frequency components of the output are different in the presence or absence of signal Sd. A detection signal NSQ generated by reception detecting circuit 161 when signal Sd is present is supplied to control circuit 140.

Base unit 2 contains a similar MSK modulating circuit 261 for encoding the identifying code ID, dial signal, channel selecting signal CH, and other signals in a signal Sm transmitted from base unit 2 to handset unit 1. In handset unit 1, an MSK demodulating circuit 163 is supplied with the output of FM demodulating circuit 126 to demodulate the identifying code ID and other signals encoded in MSK signal Sm. The demodulated signals are supplied to control circuit 140.

When an incoming call is detected in base unit 2 and signal Sd is transmitted to handset unit 1, signal NSQ is supplied to control circuit 140 and an appropriate signal is supplied to a call tone generator 164 for generating a bell sound signal. The bell sound signal is supplied to audio amplifier 127 to generate a bell sound, i.e. the telephone rings.

Control circuit 140 also generates a control signal TX supplied to frequency modulating circuit 113 to control whether or not FM signal Su is output therefrom. This is in accordance with an aspect of the present invention wherein the communication channel is established only when identity between identifying codes stored in base unit 2 and handset 1 is detected. As will be discussed below, when identity is detected, signal TX enables frequency modulated circuit 113 to output signal Su, whereas if identify is not detected, signal TX disables frequency modulating circuit 113.

Control circuit 140 also generates a muting signal MUTE supplied to audio frequency amplifier 127. As is conventional, muting signal MUTE is produced when no telephone conversation is in progress, to prevent extraneous noise from being generated and output through transducer 128.

A rechargeable battery 171 (FIG. 3A) is provided as the power source for handset unit 1. The output voltage of rechargeable battery 171 is applied as a power supply voltage to the necessary circuit elements, as is conventional. Charging terminals 172 are provided by which rechargeable battery may be recharged when handset unit 1 is mounted on base 2, and a charging circuit 173 is provided for this purpose.

Referring now to FIG. 4, control circuit 240 of base unit 2 is similar to control circuit 140 of handset unit 1 and performs many corresponding functions. Importantly, control circuit 240 provides similar means for detecting when the two identifying codes, one stored in base unit 2 and one received from handset unit 1, are or are not identical, and for supplying control signal TX to FM modulator 213 to establish or cut off transmission of signal $S_d$, respectively. Thus, control circuit 240 includes CPU 241, ROM 242, RAM 243, and I/O port 244. In accordance with an important aspect of the present invention, control circuit 240 also includes a counter 245, used in the generation of the identifying codes, as will be discussed below.

An intercom key 253, MSK modulator 261, reception detecting circuit 262 and MSK demodulator 263 are provided which perform similar functions to the corresponding elements in handset unit 1, and will not be further described. A call buzzer 266 with a locking push button switch 255 is provided. A tone generating circuit 264 generates a tone encode signal TE corresponding to the telephone number for an outgoing call, which signal TE is supplied to audio frequency amplifier 227 and thence to hybrid circuit 231 for transmission to telephone network line 3a.

A bell sound signal detecting circuit 265 is connected to the telephone network line 3a to detect an incoming bell sound signal indicating an incoming call. The output BL of bell signal detecting circuit 265 is supplied to control circuit 240. Auxilliary telephone 4 may be connected to a relay circuit 234 and thence to telephone network line 3a for use in an intercom telephone system with base unit 2. Telephone network line 3a is also connected to auxilliary telephone 4 through relays 233 and 232.

FIG. 4A illustrates a power source circuit 271 of base unit 2 which is connected via a plug 274 to a conventional ac power line through a wall outlet. Power source circuit 271 contains a power source transformer, a rectifying circuit and other known components to operate in a known manner to convert the AC signal to a DC power supply voltage, which is supplied to the necessary elements as the power supply voltage. Charging terminals 272 are provided on power source circuit 271 such that they form an electrical contact with charging terminals 172 of handset unit 1 when handset unit 1 is mounted on the concave receptacle portion 2a of base unit 2. When charging terminals 172 contact charging terminals 272 so as to charge battery 171, the formation of this electrical contact may be detected in both base unit 2 and handset unit 1 to initiate the generation of a new identifying code, in accordance with an important aspect of the present invention.

When an outgoing call is to be made, the call can be placed either from auxiliary telephone 4 when the base unit 2 is used in an intercom system, or the call may be placed from handset unit 1 remote from base unit 2. In the second case, the operation of cordless telephone 10 is controlled by CPUs 141 and 241 under the control of control program stored in ROMs 142 and 242, respectively. Initially, it is understood that handset unit 1 and base unit 2 have been set to the same channel A or B by appropriate operation of channel selecting key 154.

To make an outgoing call, talk button 152 is placed in its TALK position so that contact 152a contacts fixed contact T. An indication thereof is sent to CPU 141, and control signal TX is generated to enable frequency modulating circuit 113 to transmit a signal, which at this initial state is an unmodulated carrier signal. CPU 141 then derives an identifying code $ID_1$ from RAM 143 which had been previously generated and stored during an operation which will be described in detail below. Identifying code $ID_1$ is supplied to MSK modulating circuit 161, which converts it to MSK signal Sm and supplies it to frequency modulating circuit 113. Since frequency modulating circuit 113 is enabled to transmit signals, identifying code $ID_1$ is transmitted to base unit 2 in FM signal Su. In base unit 2, reception detecting circuit 262 generates detection signal NSQ in response to the presence of signal Su, and thereupon control circuit 240 enters a check mode to check for identity between the received and stored identification codes. Signal Sm is derived from signal Su in FM demodulator 226 and identifying code $ID_1$ in signal Sm is derived in MSK demodulator 263 and passed to CPU 241. CPU 241 then reads an identifying code $ID_2$ previously stored in RAM 243 and determines whether or not the two identifying codes $ID_1$ and $ID_2$ are identical. If they are not identical, which usually would mean that the telephone call is being made by a handset of a different telephone set, signal TX is adjusted to disable frequency modulating circuit 213 so that further signal transmission is cut off and cordless telephone 10 remains in the standby mode. On the other hand, if identification codes $ID_1$ and $ID_2$ are identical, frequency modulating circuit 213 remains enabled to transmit signal Sd and to establish the communication channel. In such case, control circuit 240 stops producing muting signal MUTE, so that conversation may take place. Furthermore, since signal Sd is transmitted back to handset unit 1 after identity of identifying codes had been detected in base unit 2, signal NSQ in handset unit 1 is supplied to control circuit 140, which produces signal TX so as to enable FM modulator 113 and further stops producing muting signal MUTE to release audio frequency amplifier 127. Thus handset unit 1 is also enabled.

At this time, a dial tone is generated in handset unit 1, and, upon operation of ten-key panel 151, dial signal DS corresponding to the telephone number being dialed is generated in CPU 141 and supplied to MSK modulating circuit 161 for conversion to MSK signal Sm and subsequent transmission to base unit 2.

Then in base unit 2 dial signal DS is derived in MSK demodulating circuit 263. In response thereto, control circuit 240 causes tone generating circuit 264 to generate tone encode signal TE, which is transmitted through audio frequency amplifier 227, hybrid circuit 231 and relays 232, 233 to telephone network line 3a. The subsequent operation of cordless telephone 10 in transmitting and receiving the telephone message signals is as described above and the description will not be repeated.

The operation of cordless telephone 10 to when an incoming call is received will now be described. It is assumed that movable contact 152a of talk switch 152 is at contact S, so that cordless telephone 10 is in the standby mode ready to receive a call. When the incoming message signal on telephone network line 3a is received by base unit 2, bell sound signal BL is derived in bell sound detector 265 and supplied to CPU 241 (FIG. 4). Signal TX is generated to enable frequency modulating circuit 213. Identifying code $ID_2$ read from RAM 233 is converted to signal Sm and supplied to audio frequency amplifier 212, so that identifying code $ID_2$ is transmitted via signal Sd to handset unit 1.

In handset unit 1 (FIG. 3), signal Sd is received and signal NSQ is derived to put control circuit 140 in the check mode. Identifying code $ID_2$ is derived in MSK demodulator 163 and CPU 141 checks for the identity between received identifying code $ID_2$ and stored identifying code $ID_1$ from RAM 133. If they are not identical, control signal TX disables frequency modulating circuit 113 and the telephone remains in the standby mode. If the two identifying codes are identical, frequency modulating circuit 113 remains enabled, and signal Su is transmitted to base unit 2. Signal MSQ is derived therein, so that base unit 2 remains enabled and the communication channel is established. Bell tone generator 164 forms a bell signal, which is supplied through amplifier 127 to loudspeaker 128 to create the conventional ringing sound. Thereafter, if handset unit 1 is picked up, and talk button 152 is placed in its TALK position, loudspeaker 128 stops ringing, amplifiers 127 and 227 are released from muting and handset unit 1 receives the call.

The cordless telephone according to the present invention generates the identifying codes internally by a system now to be described. Not only are the identifying codes generated automatically to avoid the problems in the prior art, but also the identifying codes vary from one telephone to another in a manner such that the risk of wiretapping is essentially eliminated.

Figure 5:
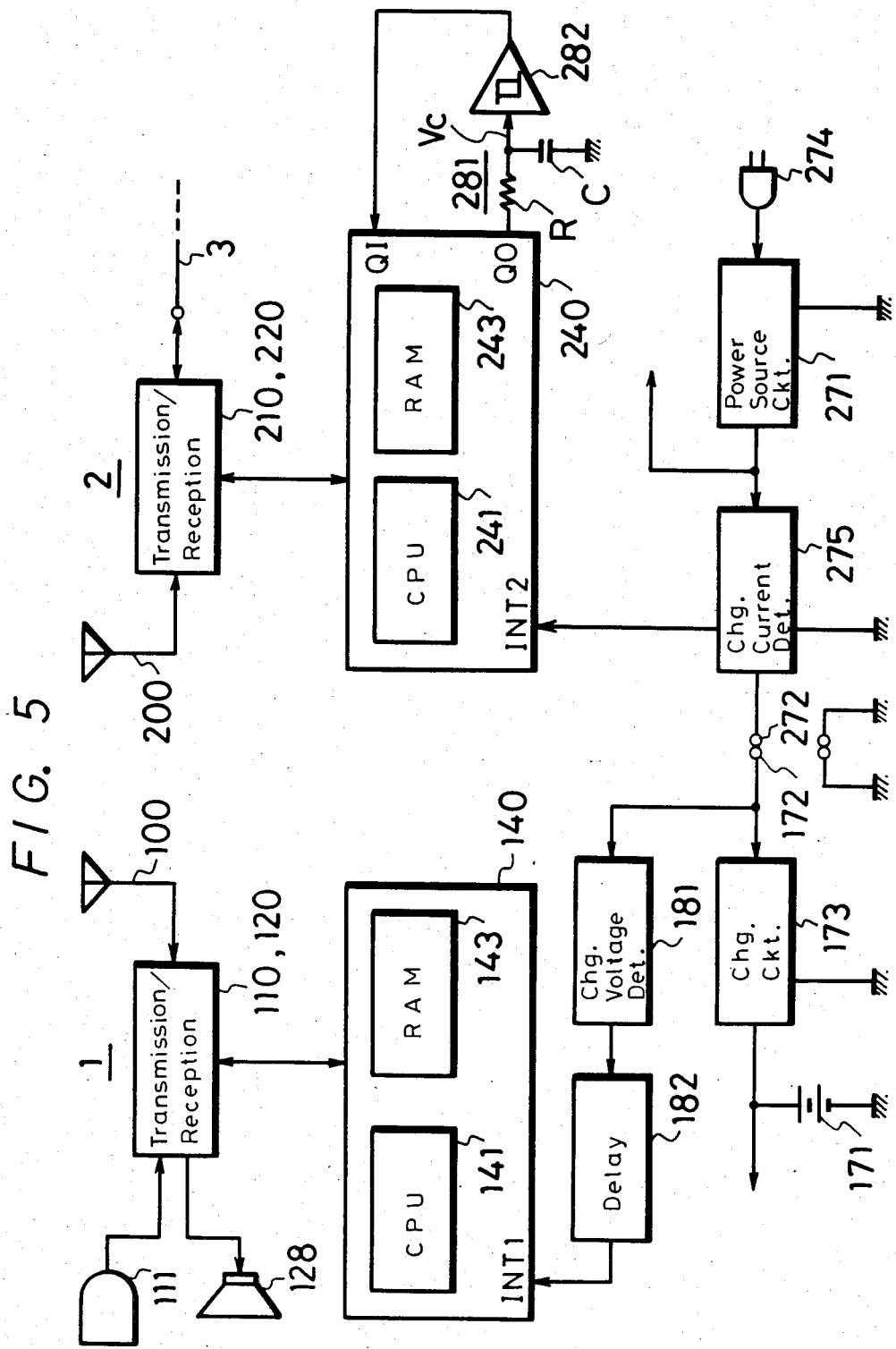
FIG. 5 is a block diagram generally illustrating the circuitry of the handset and base units when the handset unit is mounted on the base unit.

The circuitry for automatically generating a counted value to be used as a new identifying code is illustrated in FIG. 5, which shows many of the elements of handset unit 1 and base unit 2 described with reference to FIG. 3 and 4. Additional elements and their connections are illustrated in FIG. 5 to further define cordless telephone 10.

FIG. 5 illustrates cordless telephone 10 when handset unit 1 is mounted on base unit 2. Charging terminals 172 of handset unit 1 and charging terminals 272 of base unit 2 are in electrical contact. In base unit 2, a charging current detecting circuit 275 is provided in the path between power source circuit 271 and the hot terminal of charging terminals 272. Charging current detecting circuit 275 detects the current produced when handset unit 1 is mounted on base unit 2 and provides a detected output to control circuit 240 at an interrupt input INT2. CPU 241 is responsive to the receipt of this detected output to retrieve an interrupt subroutine 20 from ROM 242 and to execute the steps thereof. Interrupt subroutine 20 will be discussed in greater detail below in connection with FIG. 6.

Correspondingly, in handset unit 1, a charging voltage detecting circuit 181 is connected to the hot terminal of charging terminals 172 and detects the charging voltage present when charging terminals 172 and 272 form an electrical contact. The detected output of charging voltage detecting circuit 181 is provided to delay circuit 182 and thence to an interrupt input INT1 of control circuit 140. The delay time of delay circuit 182 is predetermined to be slightly longer than the period necessary for rechargeable battery 171 to achieve a stable terminal voltage after it begins recharging. This is because the terminal voltage is supplied to the various elements in handset 1 as the power supply voltage, and it is undesirable to continue processing until all the elements are operating in their normal fashion. Delay circuit 182 provides the necessary delay while the elements assume their normal operating conditions.

When interrupt input INT1 of control circuit 140 receives the detected output, CPU 141 retrieves an interrupt subroutine 10 from ROM 142 and executes the steps thereof.

As illustrated in FIG. 5, control circuit 240 has an output terminal QO and an input terminal QI. Connected to output terminal QO is a timing circuit 281, which in the illustrated embodiment is formed of a resistor R and a capacitor C. As is well known, such a timing circuit is an integrating circuit and has a time constant RC associated therewith which controls the rate of charging or discharging of capacitor C. The voltage across capacitor C is indicated as voltage $V_c$ at the output of timing circuit 281. Connected to this output is a trigger circuit 282, advantageously a Schmitt trigger, and the output thereof is connected to input terminal QI. When many units of the cordless telephone according to the present invention are manufactured, the resistance of resistor R and the capacitance of capacitor C are deliberately selected to vary over a predetermined range in value from telephone to telephone, whereby the time constant of any particular base unit 2 in a cordless telephone will be different from the time constant of any other particular base unit 2. The resistors and capacitors also have different ambient temperature response characteristics, so that the time constant in a particular telephone may vary slightly depending on external conditions, and this variation is also different from one telephone to another. As discussed below, the different values of the time constants produce a distinct advantage in insuring that the identifying codes generated within base unit 2 vary from unit to unit and are unpredictable, to eliminate crosstalk and wiretapping.

Input terminal QI and output terminal QO operate digitally so that each may present one of two values: $V_H$, a voltage representing the logic "1" state, and $V_L$, a voltage representing the logic "0" state. In positive logic, $V_H$ is a higher voltage than $V_L$, and positive logic will be assumed herein. Both input terminal QI and output terminal QO are normally reset to logic "0", or $V_L$. In such case, the voltage $V_c$ on capacitor C is also at $V_L$, since any higher value would be discharged.

If now output terminal QO is set to logic "1", the voltage $V_H$ appearing there is an integrable signal available to timing circuit 281, which consequently begins to integrate and $V_c$ will begin to rise. $V_c$ is supplied as the input to Schmitt trigger 282. In accordance with well known principles, the output of Schmitt trigger 282 remains constant at $V_L$ when the input is less than a threshold voltage $V_{TH}$, and then remains constant at $V_H$ when the input is greater than $V_{TH}$. In the illustrated embodiment, $V_{TH}$ is selected to have a value intermediate $V_L$ and $V_H$. Thus, as $V_c$ rises from $V_L$ but is less than $V_{TH}$, the output of Schmitt trigger 282 remains $V_L$, and so $V_L$ or logic "0" appears at input terminal QI. Theoretically, $V_c$ will rise to approach $V_H$ exponentially at a rate determined by time constant RC, so that there will come a point at a predetermined time following the moment when output terminal QO goes to logic "1" where $V_c$ equals the intermediate value $V_{TH}$. At this point the output of Schmitt trigger 282 goes to logic "1" or $V_H$, and this logic "1" appears at input terminal QI. By this means, control circuit 240 receives two signals, i.e. the detected output from charging current detecting circuit 275 appearing at interrupt input INT2 and the logic "1" appearing at input terminal QI, separated by a predetermined time. Control circuit 240 uses this predetermined time in generating the counted value to be used as a new identifying code, as will now be described in connection with FIGS. 6 and 7.

Assume that handset unit 1 has just been mounted on base unit 2, that charging current detecting circuit 275 has provided its detected ouput to interrupt input INT2 and that interrupt subroutine 20 has been retrieved by CPU 241. Also assume that charging voltage detecting circuit 181 has provided its detected output, after the delay from delay circuit 182, to interrupt input INT1 and that CPU 141 has retrieved interrupt subroutine 10. At this time, both input terminal QI and output terminal QO are reset to logic "0".

Figure 6:
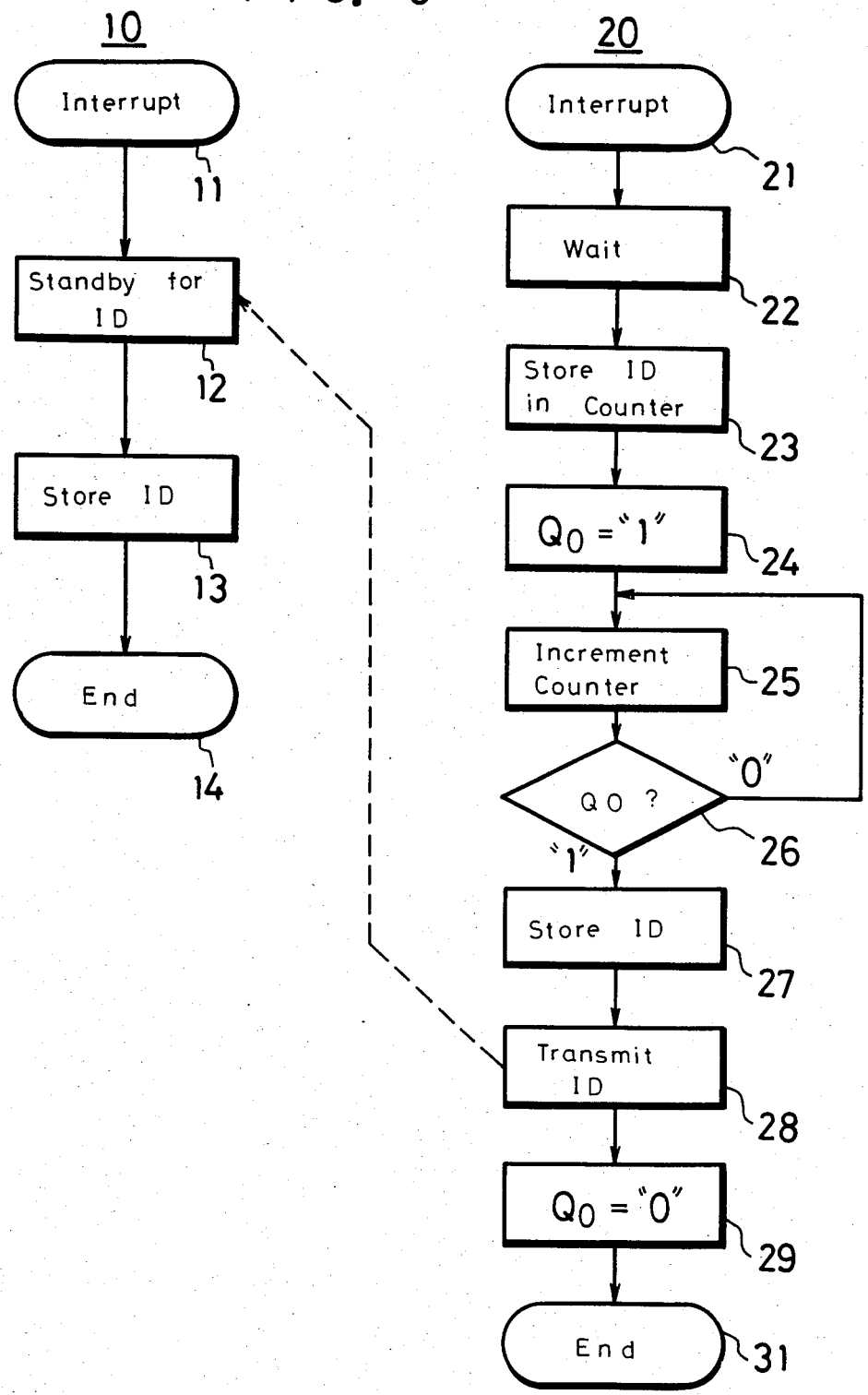
FIG. 6 is a flowchart of the control programs of the base and handset units operative for generating a new identifying code.

Referring first to FIG. 6, CPU 241 begins interrupt subroutine 20 in step 21, wherein the interrupt procedure is initialized, and then proceeds to step 22 to wait for a predetermined time. The waiting time in step 22 is chosen to be slightly longer than the delay time of delay circuit 182. Therefore, by the time CPU 241 ends step 22, the various elements of handset unit 1 have had a chance to assume their normal operating conditions and further processing can proceed without error caused by an improper supply voltage or transient effects.

CPU 241 proceeds to step 23 in which a previously generated identifying code $ID_2$ is read from RAM 243 and entered into counter 245. Identifying code $ID_2$ is the identifying code generated the previous time handset unit 1 was mounted on base unit 2, and also is the identifying code compared for identity with the received identifying code $ID_1$ from handset unit 1 during previous telephone communications. Identifying code $ID_2$ is thus used as an initial count for the following counting process. Counter 245 may advantageously be incorporated within control circuit 240, through the circuitry and software thereof.

Then CPU 241 proceeds to step 24 wherein output terminal QO is set to logic "1" or $V_H$ from its initial logic "0" level.

Figure 7A:
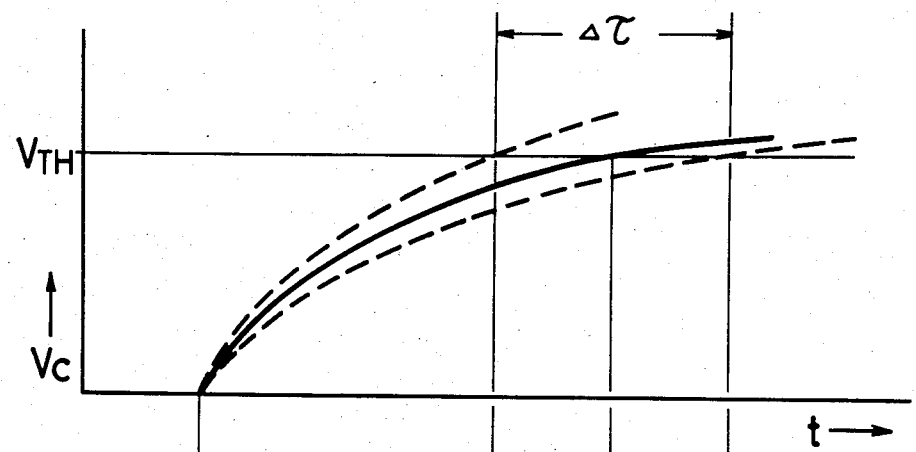
FIG. 7A is graph illustrating the generation of a new identifying code.
Figure 7B:
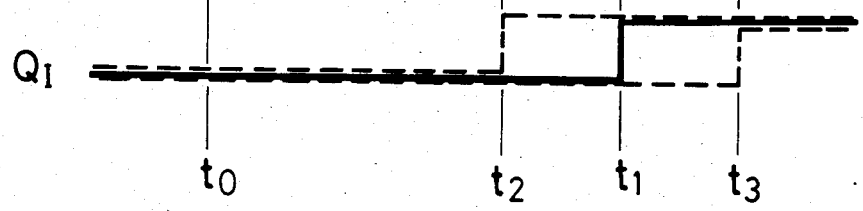
FIG. 7B is a graph for use in conjunction with FIG. 7A.

As discussed above, $V_c$ begins to rise from $V_L$. This is illustrated in FIG. 7A, which is a plot of $V_c$ verses time. Time $t_o$ in FIG. 7B is the time when logic "1" appears at output terminal QO in step 24, and $V_c$ rises as illustrated in the solid line plot on FIG. 7A. Schmitt trigger 282 receives $V_c$ as its input, but its output remains unchanged at $V_L$ as long as $V_c$ is less than $V_{TH}$. Thus, input terminal QI remains at logic "0". CPU 241 proceeds to step 25, wherein counter 245 is incremented. Then CPU 241 proceeds to step 26, wherein the logic appearing at input terminal QI is checked. At this point, the logic is logic "0", and CPU returns to step 25 to increment counter 245 again. As long as $V_c$ is less than $V_{TH}$, input terminal QI is at logic "0" and interrupt program 20 loops through steps 25 and 26 with counter 245 being steadily incremented.

However, at a time $t_1$, separated from time $t_o$ by an amount predetermined by time constant RC, $V_c$ equals $V_{TH}$ and the output of Schmitt trigger 282 goes to the logic "1" level, so that input terminal QI is also at logic "1" (FIG. 7B). Then, in step 26, CPU 241 detects logic "1" instead of logic "0" and the loop ends. The output of counter 245 at this time has a particular counted value which is now taken to be new identifying code $ID_2'$. In step 27, CPU 241 stores new identifying code $ID_2'$ in RAM 243, and in step 28, new identifying code $ID_2'$ is transmitted to handset unit 1 in the same manner as the identifying code is transmitted when an incoming telephone message signal is received. CPU 241 then proceeds to step 29, wherein output terminal QO is reset to logic "0". Not only does this stop timing circuit 281 from integrating to increase $V_c$ further, but it enables $V_c$ to discharge down to $V_L$ in preparation for the next time a new identifying code is to be generated. The logic "0" is thereby a discharge signal. Interrupt subroutine 20 then ends in step 31.

Meanwhile, in handset unit 1, interrupt subroutine 10 has proceeded from the initial interrupt step 11 to step 12, wherein it stands by to receive new identifying code $ID_2'$ from base unit 2 in step 28 therein. Previous delay step 22 has insured that by the time the new identifying code $ID_2'$ is transmitted, handset unit 1 will be ready to receive it. When new identifying code $ID_2'$ is received, CPU 141 proceeds to step 13, wherein it stores the new identifying code as new identifying code $ID_1'$ in RAM 143, and then ends interrupt subroutine in step 14.

When the new identifying code $ID_2'$ is transmitted, the received identifying code is not compared with a stored identifying code, as in the calling mode, but rather is stored directly. Thus, the communication channel is not established at this point.

Therefore the counted value of counter 245 corresponding to new identifying code $ID_2'$ is determined by the length of time during which the counter 245 is permitted to count. This length of time is predetermined by the time constant of timing circuit 281, which in the illustrated embodiment depends in turn on the values of R and C. As discussed above, when manufacturing the cordless telephone sets according to the present invention, the values of R and C from telephone set to telephone set should vary to make the time constants vary. As the values of R and C vary, the value of the voltage $V_c$ at any particular time following the initial time $t_o$ will be different, so that the time at which $V_c$ equals $V_{TH}$ varies, as illustrated in FIG. 7 in the two dashed lines, illustrating the rise in $V_c$ for two different values of the time constant RC. The upper dashed curve illustrates a case where the time constant RC is smaller than the corresponding time constant for the solid curve, so that voltage $V_c$ rises faster and the level crossing occurs at a time $t_2$ earlier than $t_1$. Correspondingly, the lower dashed curve represents a case where the time constant RC is greater than the time constant for the solid line, so that the level crossing occurs at a time $t_3$ later than $t_1$. The spread of these times, indicated in FIG. 7A as $\Delta \tau$ is provided by corresponding spreads in the values of R and C. In such case, the counted values at the end of each predetermined time will vary from telephone to telephone, insuring that the identifying codes similarly vary.

If, for example, the mean value of R is taken as $47k\Omega$ and this value is scattered over $\pm 5\%$, and further if the mean value of C is taken as 47 μF and this value is scattered over ±20%, then the time constant RC has a mean value of approximately 2.2 seconds and Δτ is approximately equal to 1.1 seconds. Furthermore, if the counting rate of counter 245 is 110 μsec/digit, then the change in the counted value can take on approximately 10,000 values. Furthermore, the response of timing circuit 281 to ambient temperature variations and to power supply voltage variations is similarly made to vary, so that, even within the same cordless telephone set, the difference in count from the initial count corresponding to previous identifying code $ID_2$ and the counted value corresponding to new identifying code $ID_2'$ will itself vary from time to time, so that there will not necessarily be an exact difference between old and new identifying codes. Thus, not only is the identifying code updated each time handset unit 1 is mounted on base unit 2, but it is varied by an amount which changes slightly from updating to updating and further varies from the amount in any other particular telephone set.

As a consequence of the scatter in the values of R and C producing the scatter in the time constant, the resistance and capacitance values need not meet rigid specifications, and further the standardization from one element to the next is minimal. Thus, they are relatively low cost items.

As a further mechanism for providing the variation in the predetermined time interval, it is also possible to have the threshold level $V_{TH}$ of Schmitt trigger 282 vary from telephone to telephone.

Therefore, in accordance with the present invention, the identifying codes in any particular telephone set will be different from the identifying codes generated in any other particular telephone set. Furthermore, since the identifying codes are generated automatically, neither a backup battery nor a backup memory for RAM 143 and RAM 243 are required, as would be necessary in the previously proposed systems. The prior art mechanical code selecting switches for setting the identifying code ID are similarly not required. Furthermore, the circuitry required is very simple and control circuits 140, 240 may be advantageously embodied in microprocessors suitably programmed in accordance with the flow chart of FIG. 6. Thus, the cordless telephone according to the present invention may be produced at a low manufacturing cost and without complex circuitry. Since a backup battery and complex circuitry are not required, the cordless telephone may be small and lightweight.

Another highly advantageous feature of the present invention is that the new identifying code $ID_2'$ is transmitted from base unit 2 to handset unit 1 over the communication channel. It is therefore not necessary to provide a signal line and terminals for electrically transmitting new identification code $ID_2'$ between the two units. Once again, this results in a significantly reduced manufacturing cost.

Since the identifying code is updated automatically whenever handset unit 1 is mounted on base unit 2, there is no need for the operator to remember or keep a written record of the current identifying code. Such a written record could be stolen. Also, there is no way to inadvertently reset or change the identifying code on handset unit 1 alone, as was possible with the prior art mechanical switches. If for any reason the identifying code needs to be reset, handset unit 1 is merely returned or mounted on base unit 2. The cordless telephone according to the present invention may be used immediately after the charging is complete.

Even if a third party should discover the current identifying code, the identifying code may be changed so easily and rapidly that the cordless telephone according to the present invention is virtually safe from wiretapping. Thus, the cordless telephone according to the present invention provides many new and highly advantageous features not previously know or available. It is at once more convenient to use and more sophisticated in the prevention of wiretapping.

The cordless telephone according to the present invention as described above in the preferred embodiment provides a highly advantageous system for communication without the risk of wiretapping. Since a new identifying code is automatically generated with each mounting of the handset unit on the base unit, this risk is significantly reduced. By virtue of the scatter in the predetermined times for counting the identifying codes vary from one telephone to the next and are not predictable within the same telephone. Even a difference in the count of one digit is enough to cut off the communication channel. Because of the simplified circuitry without backup batteries, backup memories or manual code selecting switches, the cordless telephone according to the present invention may be made small, lightweight and low cost.

Having specifically described a preferred embodiment of the invention, it will be apparent that the invention is not limited to such embodiment, and that many modifications and variations may be effected therein by one skilled in the art without departing from the spirit of scope of the present invention as defined in the appended claims.

I claim:

1. A cordless telephone, comprising:
a base unit connectable to a telephone network line for receiving and transmitting message signals therethrough;
a handset unit selectively mountable upon and separable from said base unit;
said base unit and said handset unit each including means for transmitting an identifying code signal over electromagnetic waves and means for receiving said transmitted identifying code signal;
said base unit including first memory means, first detecting means for generating a first detected output upon the mounting of said handset unit upon said base unit, means for automatically generating a counted value in response to said first detected output and a predetermined time associated therewith, and first means for storing said counted value as a new identifying code signal in said first memory means, said means for transmitting thereupon transmitting said new identifying code signal to said handset unit;
said handset unit including second memory means, second detecting means for generating a second detected output upon the mounting of said handset unit upon said base unit, and second means for storing said new identifying code signal in said second memory means in response to said second detected output;
said base and said handset unit each further including identity detecting means for detecting when a received identifying code signal is identical to an identifying code signal stored in said first and second memory means, respectively, and means for establishing a communication channel between said base and handset units only when identity is detected.

2. A cordless telephone according to claim 1, wherein said predetermined time has a duration lying within a predetermined range.

3. A cordless telephone according to claim 1, wherein said first means for storing produces a store signal in accordance with said first detected output and said means for automatically generating said counted value includes counting means producing a cyclical counted output, said counting means being responsive to said first detected output to start counting and responsive to said store signal to stop counting, said counted value being the counted output when said counting means stops counting.

4. A cordless telephone according to claim 3, wherein said first means for storing produces said store signal at the expiration of said predetermined time following the generation of said first detected output.

5. A cordless telephone according to claim 4, wherein said first means for storing includes trigger means having a predetermined triggering level for determining said predetermined time.

6. A cordless telephone according to claim 4, wherein said first means for storing includes a timing circuit having a predetermined time constant for determining said predetermined time.

7. A cordless telephone according to claim 6, wherein said timing circuit includes an integrating circuit producing a time integrated output, and said first means for storing further includes trigger means supplied with said time integrated output for producing said store signal only when said time integrated value exceeds a reference value.

8. A cordless telephone according to claim 7, wherein said base unit further includes a central control means supplied with said first detected output for controlling the operations of said means for automatically generating said counted value and said first memory means and having an input terminal receiving said store signal and an output terminal connected to said timing circuit, said central control means being operable upon the receipt of said first detected output to cause said counting means to start counting and to produce at said output terminal an integrable signal and, upon the receipt of said store signal at said input terminal, being operable to stop producing said integrable signal and to store said counted value in said memory means.

9. A cordless telephone according to claim 8, wherein said central control means produces a discharge signal after stopping production of said integrable signal to initialize said integrated output.

10. A cordless telephone according to claim 1, wherein said base unit further includes a central control means supplied with said first detected output for controlling the operations of said first means for storing, said first memory means and said means for automatically generating said counted value such that said counted value is changed by a predetermined amount from an initial count upon the generation of said first detected output.

11. A cordless telephone according to claim 10, wherein said initial count is the counted value next previously generated.

12. A cordless telephone according to claim 10, wherein said predetermined amount lies within a predetermined range of amounts.

13. A cordless telephone according to claim 10, wherein said means for automatically generating a counted value includes counting means for counting for said predetermined time following the generation of said first detected output to produce said counted value as an output thereof.

14. A cordless telephone according to claim 13, wherein said means for automatically generating a counted value includes a timing circuit having a predetermined time constant for determining said predetermined time.

15. A cordless telephone according to claim 10, wherein said central control means includes central processing means and read only memory means for storing a control program, said central processing means being operative under said control program for controlling said operations.

16. A cordless telephone according to claim 15, wherein said means for generating said counted value includes counting means producing a cyclical counted output, and said central control means is responsive to said first detected output for causing said counting means to start counting, said central control means further causing said counting means to stop counting at the expiration of said predetermined time following the generation of said first detected output, said counted value being the counted output when said counting means stops counting.

17. A cordless telephone according to claim 10, wherein said initial count is the counted value next previously generated.

18. A cordless telephone according to claim 1, wherein said handset unit is powered by a rechargeable battery and said base unit includes a recharging circuit, said battery being recharged when said handset unit is mounted on said base unit to form an electrical contact between said battery and said charging circuit, and wherein said first detecting means generates said first detected output in response to the formation of said electrical contact.

19. A cordless telephone according to claim 1, wherein upon receipt of a message signal on said telephone network line indicating an incoming call, said means for transmitting of said base unit transmits the identifying code stored in said first memory means and said identity detecting means in said handset unit detects when said transmitted identifying code is identical to an identifying code stored in said second memory means.

20. A cordless telephone according to claim 19, wherein said handset unit includes actuable switch means having a TALK position wherein said means for transmitting of said handset unit is enabled to transmit said identifying code such that, upon actuation of said switch means to said TALK position, said means for transmitting of said handset unit transmits the identifying code stored in said second memory means and said identity detecting means of said base unit detects when said transmitted identifying code is identical to an identifying code stored in said first memory means.

21. A cordless telephone according to claim 20, wherein each of said first and second memory means includes read/write memory means for storing said identifying code, and each of said identity detecting means includes control means for reading said stored identifying code from the respective read/write memory means, comparing the transmitted identifying code and the stored identifying code, and generating a control signal indicating the existence or not of identity therebetween, said cordless telephone being responsive to said control signal for establishing said communication channel.

22. A cordless telephone according to claim 21, wherein said control means includes mircoprocessor means.

23. A cordless telephone according to claim 22, wherein said microprocessor means includes a central processing means and read only memory means for storing a control program, said central processing means being operative under said control program for detecting said identity.

* * * * *